Figure 1:
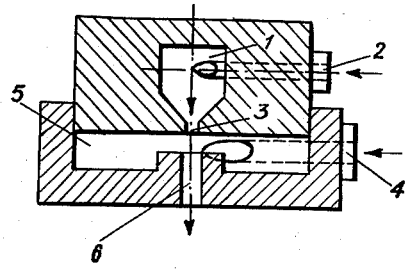

May 16, 1961   A. JOLY   2,984,544
PROCESS FOR THE PREPARATION OF LEAD OXIDE
Filed March 28, 1957   2 Sheets-Sheet 1

INVENTOR
ANDRÉ JOLY
BY Paul M. Craig
ATTORNEY

INVENTOR
ANDRÉ JOLY

United States Patent Office 2,984,544
Patented May 16, 1961

2,984,544

PROCESS FOR THE PREPARATION OF LEAD OXIDE

André Joly, Paris, France, assignor to Compagnie Generale d'Electricite, Paris, France, a corporation of France Filed Mar. 28, 1957, Ser. No. 649,172
Claims priority, application France Apr. 5, 1956
6 Claims. (Cl. 23—146)

This invention relates, in general, to the production of oxides. More specifically, the present invention is directed to the preparation of active material for lead storage batteries with oxide coatings. It can, however, also be applied to any other metal having a relatively low melting point.

The term "active material" is understood to include, for example, chemically defined oxides such as litharge PbO and red lead $Pb_3O_4$ or a mixture of particles of free lead and particles of more or less oxidized lead, the composition of which varies according to the conditions of production. All these products, as well as similar ones used in other industries shall be designated hereinafter by the all-embracing term "lead oxide."

Numerous methods are known for the production of lead oxide: oxidizing of lead balls by friction, air stream over a surface of molten lead, pulverizing of solid lead metal in a heated oxidizing atmosphere. The oxide obtained is removed by screening, by pneumatic take-off etc.

The present invention is directed to a new process capable of increasing the output and of leaving a great latitude in the composition of the oxide to be obtained.

The process for the production of oxide according to the present invention is characterized in that the lead, or other metal in a liquid condition, is imparted a rapid gyratory motion causing its atomizing, undergoes a translatory motion along the axis of this gyratory motion and is oxidized by a gaseous stream during this two-fold gyratory and translatory motion.

There is now used, in the paint industry, and in the coating and metallization industry, a so-called "atomizer" device which causes, by a rapid gyratory motion inside a hollow revolution body of a suitable shape the subdivision of a liquid jet into very fine particles and its evacuation under the shape of a dispersed jet. It is the principle of this device which is involved in the invention.

The translatory motion of the lead during its gyration may be obtained in various manners: gravity, suction, shaping of the inner walls of the atomizing apparatus etc.

Inasmuch as, on the one hand, it is possible to act on the pressure, speed and temperature of the liquid lead and on the other hand, the composition, pressure and temperature of the gaseous oxidizing stream may be adjusted at will, an appropriate choice of these various parameters will make it possible to obtain a lead oxide having a definite composition.

The object of the invention is, therefore, to provide a new and improved process for the production of oxides capable of increasing the yield of oxide and simplifying the production thereof.

Various types of apparatus may be designed for applying the process according to the invention; the applicant recommends, preferably the following simplified apparatus using the translation by gravity:

Two superposed enclosures and, in communication, from top to bottom, an atomizing enclosure and an oxidizing enclosure, each one of them provided with tuyeres for the tangential arrival of the reaction products.

The appended drawing shows, diagrammatically, a non-limitative example of embodiment of an apparatus of this type.

Figure 3:
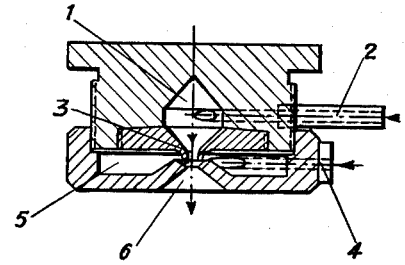
Figure 2:
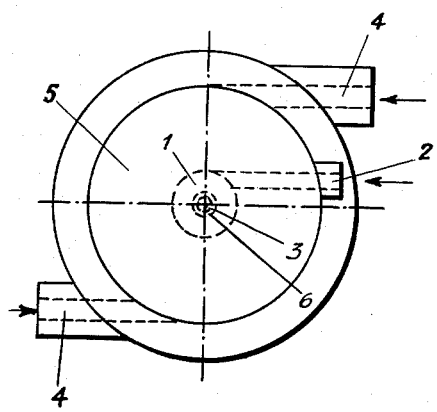
Figure 4:
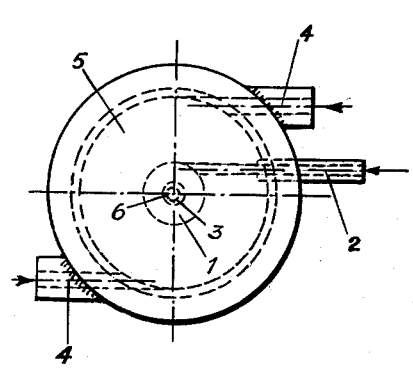
Figure 5:
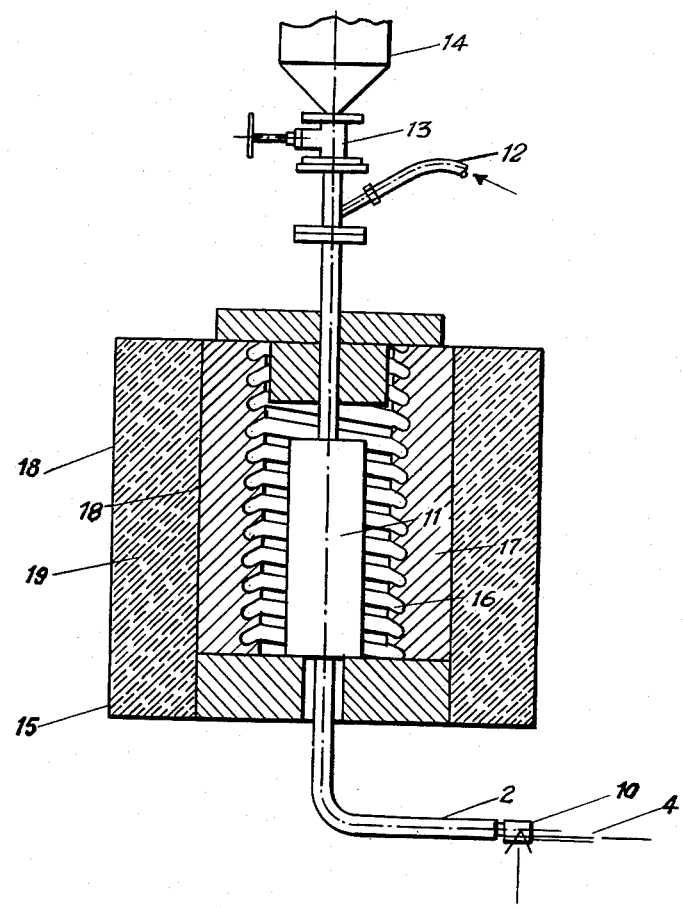

Figure 1 is a view thereof, in sectional elevation.
Figure 2 is a plan view thereof.
Figures 3 and 4 are respectively modifications of Figures 1 and 2.
Figure 5 is an assembly view of an installation for the production of oxides comprising an atomizer such as the one shown in Figures 1 and 2 or 3 and 4.

As shown in Figures 1 and 2 the enclosure 1 serving as an atomizer is a body of revolution of suitable shape and material such as stainless steel. Such a shape is that of a cylinder tapering at the bottom into a cone frustum; at about mid-height in the cylinder a channel 2 feeds into the enclosure a tangential jet of liquid lead at a suitable pressure and temperature. The liquid lead, dispersed into fine particles issues through the lower aperture 3.

The enclosure 5 of material similar to that of enclosure 1 has the shape of a flat cylindrical box with a central aperture on each one of its faces; the upper aperture coincides with the aperture 3 and the lead oxide escapes through the lower aperture 6; suitable gas jets emerge from inlet ducts 4, whirl inside the enclosure 5 and cause the oxidizing of the lead particles to a more or less large extent.

These gas jets may consist of air, dry or damp, oxygenated or not, of steam or any other suitable oxidizing gas mixture and the inlet ducts 4 at their apertures may be heated if necessary.

The shapes and dimensions of the enclosures, the number, shape and location of the inlet channels and apertures may be modified according to the needs of the invention, without departing from the scope thereof.

The lead used is first liquefied in any suitable oven in a suitable atmosphere, nitrogen for instance, the desired pressure is given either by a gas pressure or by gravity or by their combined actions or by any other means.

As stated above, the variation of the production conditions makes it possible to modify at will the physical and chemical characteristics of the lead oxide powder. However, if desired and according to needs, the jet issuing from the aperture 6 may be passed through an oven designed for increasing the degree of oxidation; by means of a mill, it will be possible also to give the oxide powder a predetermined granulometric constitution.

The apparatus in Figures 3 and 4 is similar to that of Figures 1 and 2 and the same reference numbers designate the same parts. In this second embodiment the inner space of enclosure 1 has substantially the shape of two cone frustums opposite at their bases, with a cylindrical central portion into which the inlet duct 2 for the feeding of liquid metal opens; this configuration may facilitate the atomizing of the metal.

Aperture 6 of a conical shape facilitates the removal of the reaction product.

There is represented in Figure 5 an assembly installation in which is mounted at 10, an apparatus such as the one just described. 14 designates diagrammatically, an oven for the preliminary melting of the metal; this oven may be put in communication through a gate 13 with the casing 11 of the electric oven 15 intended for raising the liquid metal to the temperature required for the production of oxide; 16 is the electric heating resistor which is imbedded in a refractory mass 17 and the whole is enclosed inside a double cylindrical casing of sheet metal 18 with a heat insulating material 19. When the atomizing of the metal is to be effected, the metal is forced out of the enclosure 11 towards the atomizer 10 by sending a suitable gas under pressure through the piping 12.

I claim:
1. A process for the production of lead oxide, which comprises the following steps, bringing lead to a molten condition, conveying the molten lead under pressure into a cylindrical chamber in the direction substantially tangential to the inner wall of said chamber to thereby disperse said metal into fine particles and impart a gyratory movement to the atomized metal, imparting a translatory movement to the flow of particles in the direction of the axis of said chamber, and subjecting said flow of particles to a stream of oxidizing gas directed tangentially to said gyratory movement, said oxidizing gas being selected from the group consisting of air, steam, oxygen and mixtures thereof.

2. A process according to claim 1, wherein said stream of oxidizing gas is co-directional to the gyratory movement of the atomized metal.

3. A process according to claim 1, wherein said stream of oxidizing gas is directed oppositely to the gyratory movement of the atomized metal.

4. A process according to claim 1, wherein the axial translatory movement of the gyratory flow of atomized metal is imparted by gravity.

5. A process for the production of lead oxide which comprises, conveying molten lead under pressure horizontally into a cylindrical chamber in the direction substantially tangential to the inner wall of said chamber to thereby atomize said metal into a mist of fine particles and impart a gyratory movement to the atomized metal, imparting a translatory movement to the flow of particles in the direction of the axis of said chamber, and subjecting said flow of particles to a stream of oxidizing gas directed transversely to said translatory movement and tangentially to said gyratory movement, said oxidizing gas being selected from the group consisting of air, steam, oxygen and mixtures thereof.

6. A process for the production of lead oxide which comprises, conveying molten lead under pressure into a cylindrical chamber in a direction tangential to the inner wall of said chamber and transverse to the axis of said chamber to thereby atomize said molten metal into a mist of fine particles and impart a gyratory movement about the axis of said chamber to the atomized metal, imparting a translatory movement to the flow of particles in the direction of the axis of said chamber, and subjecting said flow of particles to a stream of oxidizing gas directed transversely to said translatory movement and tangentially to said gyratory movement, said oxidizing gas being selected from the group consisting of air, steam, oxygen and mixtures thereof.

References Cited in the file of this patent

UNITED STATES PATENTS

| | | |
|---|---|---|
| 1,649,428 | Waring | Nov. 15, 1927 |
| 1,913,391 | Hutchinson | June 13, 1933 |
| 2,019,536 | Kemp et al. | Nov. 5, 1935 |
| 2,235,487 | Mayer | Mar. 18, 1941 |
| 2,358,068 | Hiller | Sept. 12, 1944 |
| 2,441,613 | Balassa | May 18, 1948 |
| 2,490,519 | Haunz | Dec. 6, 1949 |
| 2,890,929 | Rummert | June 16, 1959 |

FOREIGN PATENTS

| | | |
|---|---|---|
| 20,797 | Great Britain of 1904 | Sept. 27, 1904 |